(12) United States Patent
Kuroki

(10) Patent No.: US 9,857,667 B2
(45) Date of Patent: Jan. 2, 2018

(54) MOUNTING APPARATUS PROVIDED WITH TWO SPRING MEMBERS AND HOLDING MEMBER

(71) Applicant: Panasonic Intellectual Property Management Co., Ltd., Osaka (JP)

(72) Inventor: Hiroyuki Kuroki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/341,369

(22) Filed: Nov. 2, 2016

(65) Prior Publication Data

US 2017/0075198 A1 Mar. 16, 2017

Related U.S. Application Data

(63) Continuation of application No. PCT/JP2015/001129, filed on Mar. 3, 2015.

(30) Foreign Application Priority Data

May 13, 2014 (JP) ................................. 2014-099184

(51) Int. Cl.
  *G03B 17/00* (2006.01)
  *G03B 17/56* (2006.01)
  (Continued)

(52) U.S. Cl.
  CPC ........... *G03B 17/561* (2013.01); *F16M 13/04* (2013.01); *H04N 5/2252* (2013.01);
  (Continued)

(58) Field of Classification Search
  CPC ...................................... F16M 13/04
  (Continued)

(56) References Cited

U.S. PATENT DOCUMENTS 2,369,829 A * 2/1945 Johnson ............... A42B 1/24
  224/181
4,953,766 A * 9/1990 Cruickshank ........... A42B 1/24
  2/422
(Continued)

FOREIGN PATENT DOCUMENTS

JP 58-103175 7/1983
JP 2-203697 8/1990
(Continued)

OTHER PUBLICATIONS

International Search Report dated May 19, 2015 in International (PCT) Application No. PCT/JP2015/001129.
(Continued)

*Primary Examiner* — Clayton E Laballe
*Assistant Examiner* — Kevin Butler
(74) *Attorney, Agent, or Firm* — Wenderoth, Lind & Ponack, L.L.P.

(57) ABSTRACT

In a mounting apparatus, a first spring member has an arc shape, and a second spring member is provided integrally with the first spring member or provided separately from the first spring member to be coupled to the second spring member. The second spring member is disposed inside the first spring member at a predetermined angle from the first spring member. A holding member holds the second spring member to be fitted into the holding member such that the holding member is in contact with a wearer. The configuration is able to reduce a load applied onto a head of the wearer while providing an improved fitting on the wearer.

14 Claims, 15 Drawing Sheets

(51) Int. Cl.
*F16M 13/04* (2006.01)
*H04N 5/225* (2006.01)
*F16M 13/00* (2006.01)
*H04R 1/10* (2006.01)

(52) U.S. Cl.
CPC ............ *H04N 5/2257* (2013.01); *F16M 13/00* (2013.01); *G03B 17/00* (2013.01); *G03B 17/56* (2013.01); *H04R 1/10* (2013.01)

(58) Field of Classification Search
USPC .......................................................... 396/420
See application file for complete search history.

(56) References Cited

U.S. PATENT DOCUMENTS

| | | | | |
|---|---|---|---|---|
| 5,893,496 | A * | 4/1999 | Katz | F21L 15/14 224/181 |
| 6,016,160 | A * | 1/2000 | Coombs | A42B 3/042 348/61 |
| 6,055,312 | A * | 4/2000 | Pralus | H04M 1/05 379/430 |
| 6,276,580 | B1 * | 8/2001 | Kitahara | A44C 5/14 224/164 |
| 6,560,029 | B1 * | 5/2003 | Dobbie | G02B 23/125 2/6.1 |
| 7,124,425 | B1 * | 10/2006 | Anderson, Jr. | H04N 21/21805 348/157 |
| 7,186,159 | B1 * | 3/2007 | Baxter | A42B 1/12 2/422 |
| 2003/0106918 | A1 * | 6/2003 | Hung | A42B 1/242 224/222 |
| 2008/0131106 | A1 * | 6/2008 | Bruce | G03B 17/08 396/25 |
| 2008/0205036 | A1 * | 8/2008 | Tarter | F21L 4/04 362/105 |
| 2009/0262205 | A1 * | 10/2009 | Smith | H04N 5/2251 348/211.4 |
| 2010/0001187 | A1 * | 1/2010 | Fenske | G02B 27/017 250/330 |
| 2010/0041961 | A9 * | 2/2010 | Epley | A61B 5/0484 600/301 |
| 2010/0299814 | A1 * | 12/2010 | Celona | G02B 23/125 2/422 |
| 2011/0097069 | A1 * | 4/2011 | Braithwaite | A42B 1/242 396/420 |
| 2012/0068914 | A1 * | 3/2012 | Jacobsen | G06F 1/163 345/8 |
| 2012/0287284 | A1 * | 11/2012 | Jacobsen | G06F 1/163 348/158 |
| 2013/0258270 | A1 * | 10/2013 | Cazalet | G02C 11/10 351/114 |

FOREIGN PATENT DOCUMENTS

| | | | |
|---|---|---|---|
| JP | 7-181422 | | 7/1995 |
| JP | H07181422 | * 7/1995 | ............ G02B 27/02 |
| JP | 11-127919 | | 5/1999 |
| JP | 2000-507760 | | 6/2000 |
| JP | 2002-216908 | | 8/2002 |
| JP | 2004-328938 | | 11/2004 |
| JP | 2010-169742 | | 8/2010 |

OTHER PUBLICATIONS

International Preliminary Report on Patentability and Written Opinion of the International Searching Authority dated Nov. 24, 2016 in corresponding International Application No. PCT/JP2015/001129.

* cited by examiner

MOUNTING APPARATUS PROVIDED WITH TWO SPRING MEMBERS AND HOLDING MEMBER

CROSS-REFERENCE TO RELATED APPLICATIONS

This is a continuation appliction based on PCT application No. PCT/JP2015/001129 as filed on Mar. 3, 2015, which claims priority to Japanese patent application No. JP 2014-099184 as filed on May 13, 2014, the contents of which are incorporated herein by reference.

BACKGROUND OF THE DISCLOSURE

Field of the Disclosure

The present disclosure relates to a mounting apparatus.

Description of Related Art

Patent Document 1 discloses a known headset apparatus exemplifying an apparatus mounted on a head or any other region. In recent years, an increasing number of users wear small cameras on their heads or other regions via mounting apparatuses to play skiing, surfing, and the like and capture realistic images.

PRIOR ART DOCUMENT

Patent Document

Patent Document 1: Japanese Patent Laid-open Publication No. JP H02-203697 A

SUMMARY OF THE DISCLOSURE

Non-limiting and exemplary embodiments provide a mounting apparatus having a mounting performance higher than that of prior art.

In order to achieve the object of the present disclosure, according to one aspect of the present disclosure, there is provided a mounting apparatus including first and second spring members, and a holding member. The first spring member has an arc shape, and the second spring member is provided integrally with the first spring member or provided separately from the first spring member to be coupled to the second spring member. The second spring member is disposed inside the first spring member at a predetermined angle from the first spring member. The holding member holds the second spring member to be fitted into the holding member such that the holding member is in contact with a wearer.

According to another aspect of the present disclosure, there is provided a mounting apparatus including a first spring member, and an adjustment mechanism. The adjustment mechanism adjusts a length of a portion of the first spring member, where the portion of the first spring member is fitted into the adjustment mechanism. The adjustment mechanism includes a pressing member, second spring member having a width gradually decreasing toward a bottom of the second spring member. The pressing member presses the first spring member toward the bottom of the second spring member, and the second spring member pinches a pair of opposing plate-end surfaces of the first spring member in accordance with the pressing.

The present disclosure provides a mounting apparatus having a mounting performance higher than that of prior art.

NON-LIMITING AND EXEMPLARY EMBODIMENTS

Non-limiting and exemplary embodiments will now be described below with reference to appropriate drawings. Note that too detailed description will not be provided herein. For example, already well-known features may not be described in detail and substantially same configurations will not be described repeatedly. This will prevent excessively long description below and facilitate comprehension by those skilled in the art.

The inventor will provide the accompanying drawings and the following description for sufficient comprehension of the present disclosure by those skilled in the art, and does not intend to limit the subject matter recited in the claims with the drawings and the description.

First Embodiment

1. Summary

The first embodiment exemplifies a mounting apparatus according to the present disclosure, specifically, a head mount 100. The head mount 100 serves as a mounting apparatus worn on a head of a wearer. The head mount 100 is optionally equipped with a camera body 170. The wearer substantially wears the camera body 170 at the head in this case. When the wearer wearing the camera body 170 at the head carries out activities such as skiing and surfing, the wearer can photograph images similar to scenes viewed by the wearer.

A wearer typically wears the head mount 100 continuously for a predetermined period of time such as 30 minutes. Fitting onto the head is often improved by an enhancing pressing force for mounting the head mount 100. Such a method is adopted particularly in a case where the wearer moves during skiing, surfing, or the like. Unfortunately, this method leads to accumulation of loads applied to the head of the wearer corresponding to a pressing force for mounting for a long period of time. In order to solve the problems, the inventor has devised the head mount 100 which is configured to improve fitting onto the head of the wearer as well as reducing the load applied to the head.

The head mount 100 typically includes an adjuster mechanism configured to adjust a length of the worn head mount 100 so as to fit different wearers' head sizes. The adjuster mechanism loosens to cause fit deterioration if the head mount 100 is worn continuously for a predetermined period of time. A firm adjuster mechanism will inhibit such a defect, but will cause increase in weight of the head mount 100, and increase in cost or design deterioration due to a larger number of components. In order to solve the problem, the inventor has devised the head mount 100 which is light in weight and configured simply while achieving continuous fit into the head.

2. Configuration of Head Mount 100

The head mount 100 according to the first embodiment will be described below in terms of its detailed configuration with reference to the drawings.

Figure 1A:
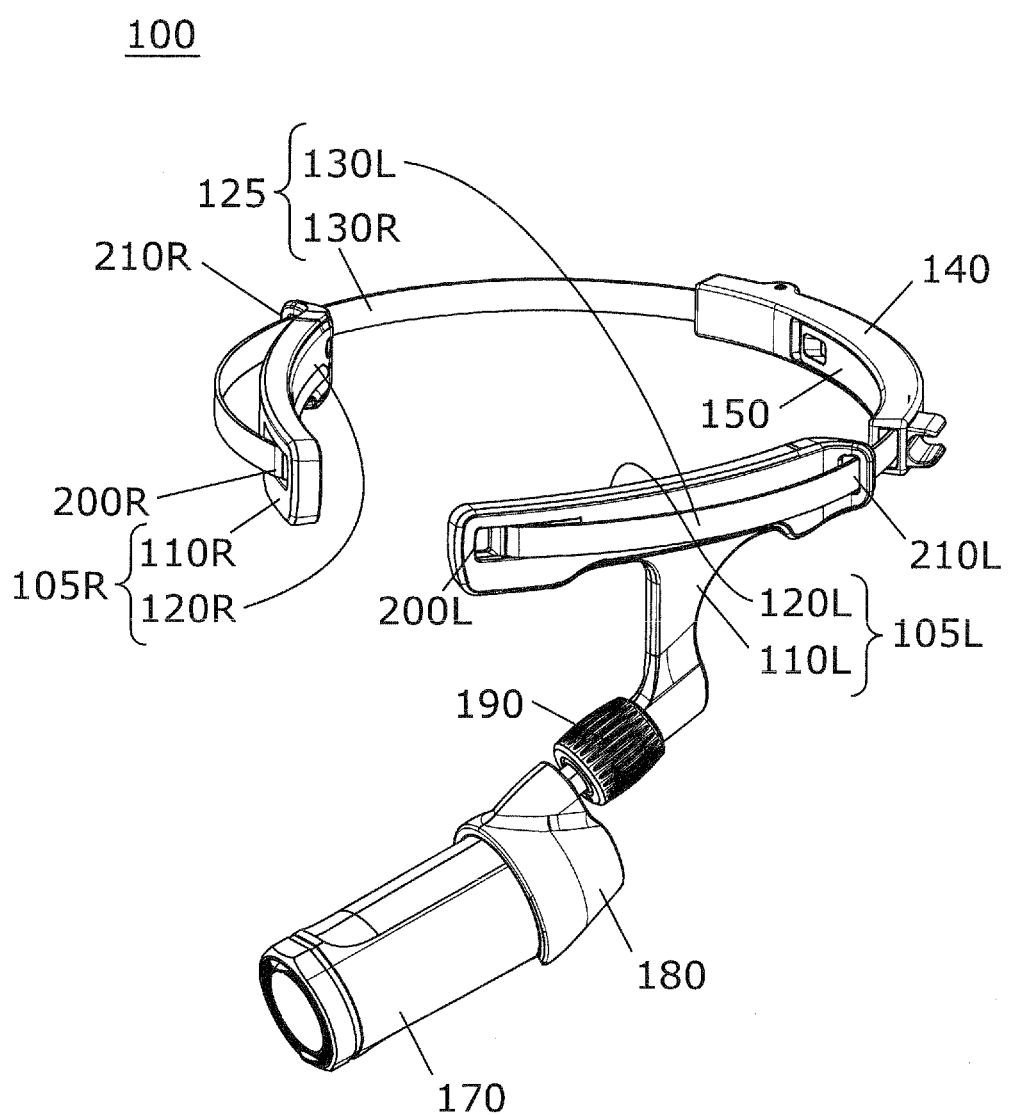
FIG. 1A is a perspective view of an entire head mount 100.
Figure 1B:
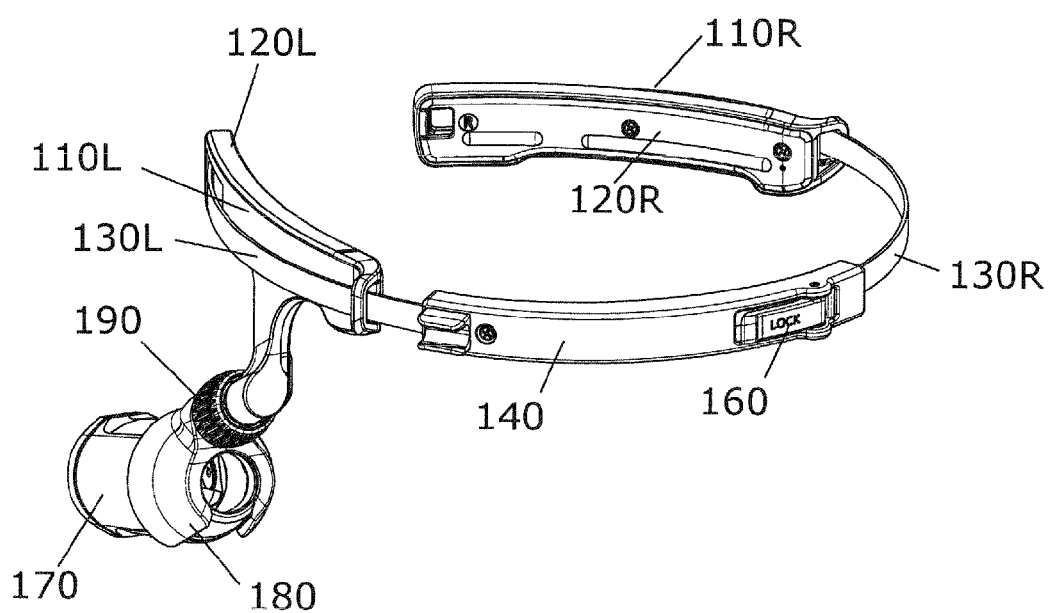
FIG. 1B is another perspective view of the entire head mount 100.

FIGS. 1A and 1B are perspective views of the entire head mount 100. FIG. 1A is a left front perspective view of the entire head mount 100. FIG. 1B is a left rear perspective view of the entire head mount 100. Further, FIG. 2 is an exploded perspective view of the head mount 100.

As shown in FIGS. 1A and 1B, the head mount 100 includes pad units 105, a head arm unit 125, and an adjusting unit 135. When a pair of left and right members included in the head mount 100 needs to particularly be distinguished from each other in the following description, the member to be disposed substantially adjacent to a left ear of the wearer will have a reference sign "L" whereas the member to be disposed substantially adjacent to aright ear of the wearer will have a reference sign "R" added at the ends of the assigned numbers, respectively.

The pad units 105 include a pair of left and right members. The head mount 100 includes a pad unit 105L disposed at an upper portion of the left ear of the wearer, and then, a pad unit 105R is in contact with an upper portion of the right ear of the wearer.

Figure 2:
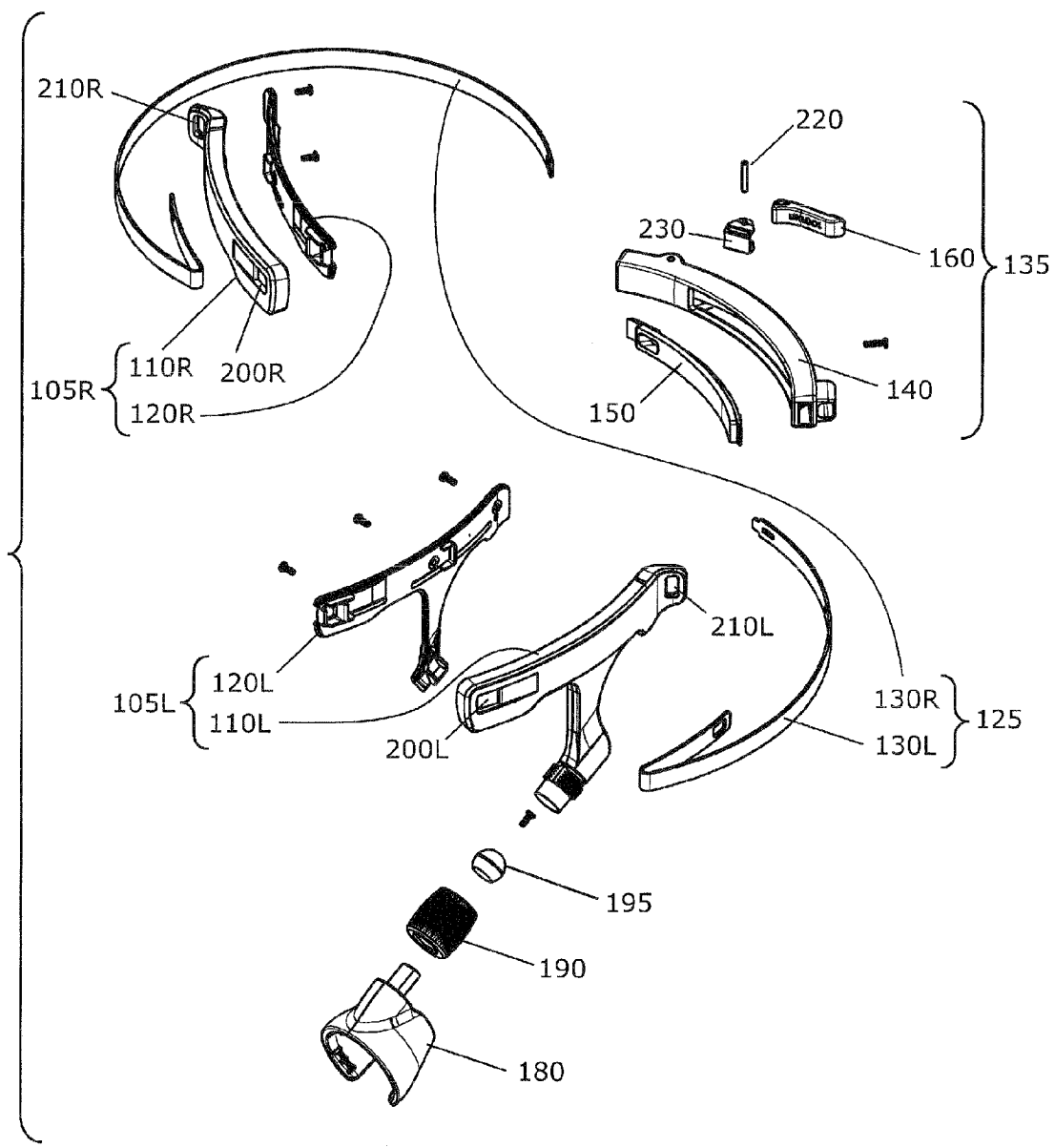
FIG. 2 is an exploded perspective view of the head mount 100.

As shown in FIG. 2, the pad unit 105L is assembled by fixing a pad base 110L and a pad cover 120L with screws. The pad base 110L is a member configuring an outer portion of the pad unit 105L. In contrast, the pad cover 120L is a member for configuring an inner portion of the pad unit 105L. The pad base 110L has two openings, namely, a front hole 200L and a rear hole 210L. The front and rear holes 200L and 210L of the pad base 110L allow a head arm 130L to pass therethrough, respectively. The pad unit 105L is made of a resin material. The pad unit 105R is configured in a manner similar to that of the pad unit 105L, and will not be described herein.

The pad unit 105L (including the pad base 110L and the pad cover 120L) extends forward from a lower portion of the left ear of the wearer. The extension of the pad unit 105L has a distal end coupled with a camera attachment mechanism for a camera body 170. The camera body 170 includes an optical system such as a focusing lens, as well as a CMOS image sensor, and is configured to capture a subject image. The camera attachment mechanism includes a camera holder 180, a nut 190, and a ball 195. The camera holder 180 holds the camera body 170. The nut 190 is provided to fix an angle onto the pad unit 105L of the camera holder 180, which is adjusted by a sphere of the ball 195. The wearer can thus adjust a direction of capturing an image with the camera body 170. The head mount 100 according to the first embodiment is exemplarily configured to attach the camera body 170 at a position ahead of the lower portion of the left ear of the wearer, but can be configured differently. The camera body 170 is alternatively disposed at the upper portion of the left ear of the wearer. Still more alternatively, the camera attachment mechanism is provided at the pad unit 105R, and the camera body 170 is attached at a position substantially adjacent to the right ear of the wearer.

The head arm unit 125 includes two head arms, namely, the head arm 130L and a head arm 130R. The head arm 130L is fitted into the adjusting unit 135 so as to be fixed thereinside. Meanwhile, the head arm 130R is similarly fitted into the adjusting unit 135 but is configured to adjust a length of the portion fitted into the adjusting unit 135 (a position of the fixed head arm 130R in the adjusting unit 135) by means of a lock mechanism to be described later. The head mount 100 is thus roughly adjusted to the head size of the wearer. The head mount 100 according to the first embodiment is configured to adjust the length of the fitted portion of the head arm 130R, but can be configured differently. Alternatively, the head arm 130L is configured to be adjustable in terms of a length of a fitted portion thereof or both of the two head arms are configured to be adjustable in terms of the lengths of the fitted portions. Fitting improvement by means of the pad units 105 and the head arm unit 125 will be described in detail later.

As described above, the adjusting unit 135 is configured to roughly adjust the head mount 100 to the head size of the wearer. The adjusting unit 135 is assembled by fixing an adjusting base 140 and an adjusting cover 150 with a screw. The adjusting unit 135 includes an adjusting lever 160, and is configured to lock the position of the head arm 130R fitted into the adjusting unit 135. This lock mechanism will be described in detail later.

The above description exemplifies the case where the camera body 170 is attached to the camera holder 180, but the present disclosure should not be limited thereto. The head mount 100 can alternatively be provided with any other device unit such as a lighting unit or a microphone unit.

3. Fitting Improvement by Means of Pad Unit 105 and Head Arm 125

Fitting improvement by means of the pad units 105 and the head arm unit 125 will be described next.

The head arm unit 125 has an arc shape following a rear head of the wearer, and is made of an elastic spring. The head arm unit 125 is divided into two parts, i.e. the head arm 130L and the head arm 130R. The length of the head mount 100 is thus roughly adjustable in consideration of distribution of human head widths.

Figure 3:
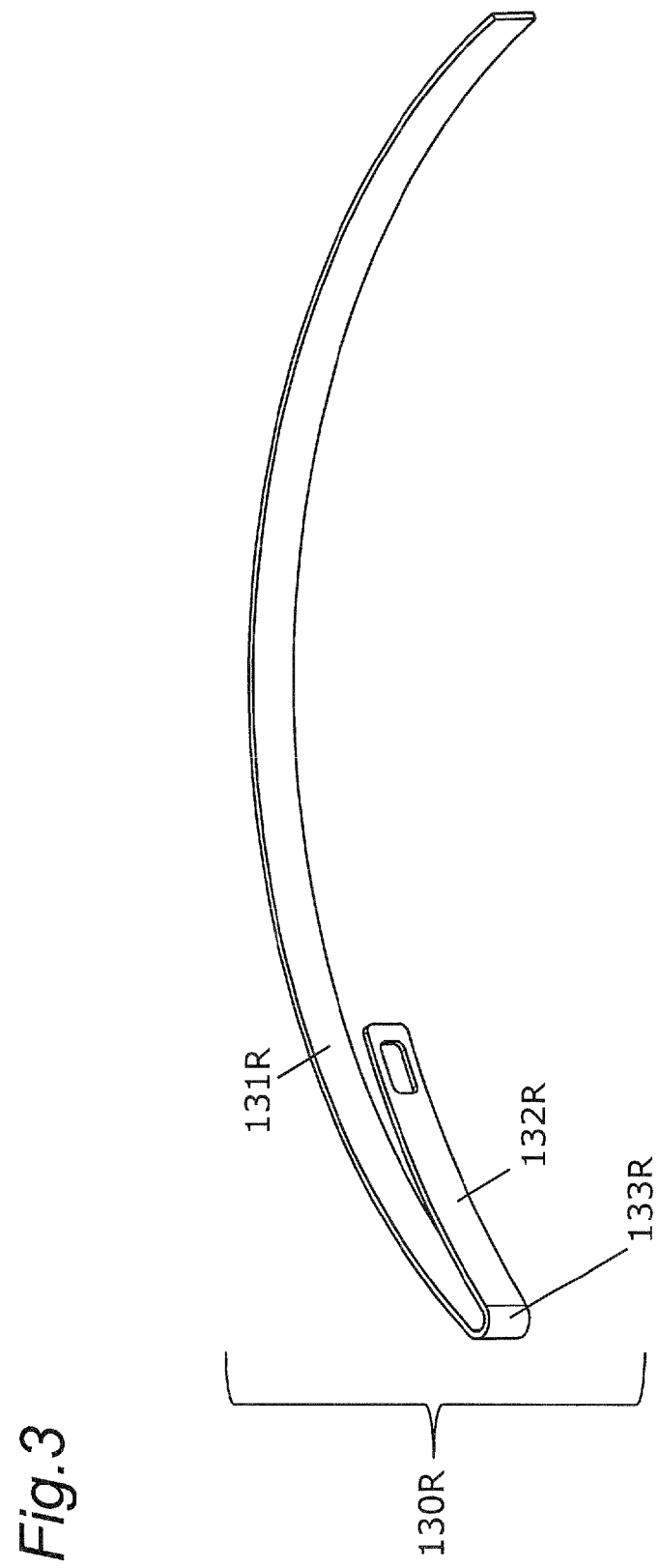
FIG. 3 is a perspective view of a head arm 130R.

FIG. 3 is a perspective view of the head arm 130R. The head arm 130R has a pair of opposing plate surfaces of relatively large areas, and a pair of opposing plate-end surfaces of relatively small areas. The head arm 130L is configured in a manner similar to that of the head arm 130R shown in FIG. 3, and will not be described in detail herein. The head arm 130R is functionally divided into portions. The head arm 130R is a spring member that has an arc shape and is smoothly bent at a bending point 133R. The long portion extending from the bending point 133R will be called a head spring 131R. Meanwhile, the short portion extending from the bending point 133R will be called a pad spring 132R. The length of the pad spring 132R and an initial angle of the pad spring 132R from the head spring 131R are designed, for example, such that the pad spring 132R possibly generates a surface-lateral pressure to the head of the wearer as evenly as possible.

The head arms 130 are made of, for example, a stainless steel material for high rust resistance in consideration of outdoor use. Meanwhile, the head arms 130 are made of, for example, a spring steel material for high shape restoration.

Figure 4:
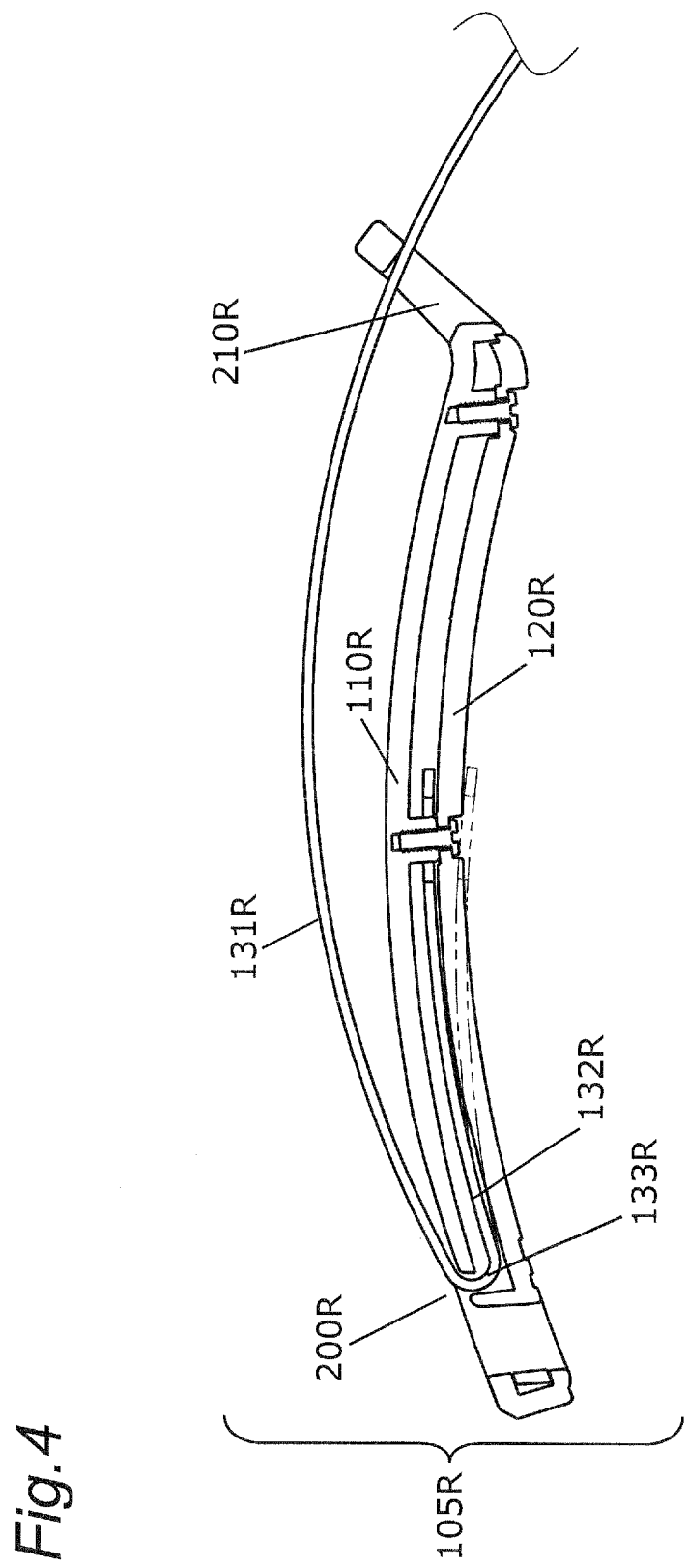
FIG. 4 is an explanatory configuration view of a pad unit 105R.

FIG. 4 is an explanatory configuration view of the pad unit 105R. The pad unit 105L is configured in a manner similar to that of the pad unit 105R shown in FIG. 4, and will not be described in detail herein. As shown in FIG. 4, the pad spring 132R is fitted into the pad unit 105R through the front hole 200R thereof, and is disposed along an inner surface of the pad unit 105R. FIG. 4 has a two-dot chain line indicating a position of the pad spring 132R in a case where the pad spring 132R is not fitted into the pad unit 105R. The pad spring 132R fitted into the pad unit 105R has a biasing force of restoring the pad spring 132R toward the head of the wearer.

The head spring 131R extending from the bending point 133R is disposed to pass through the rear hole 210R of the pad unit 105R. The position where the head spring 131R passes through the rear hole 210R changes in accordance with the size and the shape of the head of the wearer. The biasing force of restoring the pad spring 132R toward the head of the wearer varies in accordance with the displacement of the position of the head spring 131R passing through the rear hole 210R. The rear hole 210R is not essentially provided. The rear hole 210R limits the movable range of the head arm 130R to prevent excessive biasing of the pad spring 132R.

Figure 5A:
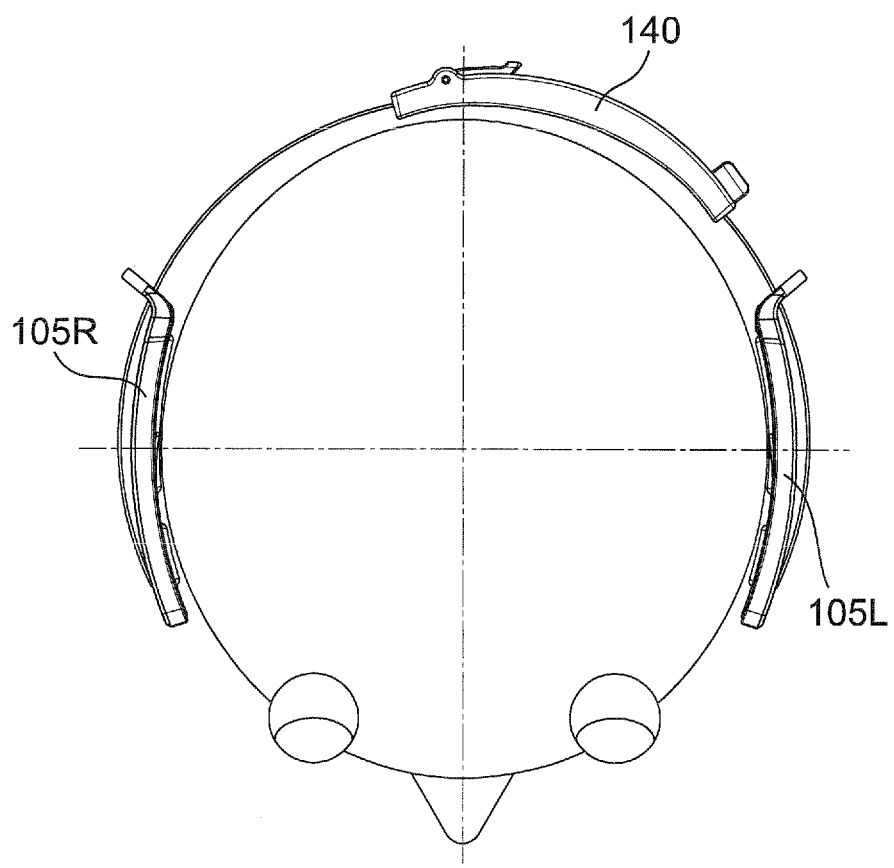
FIG. 5A is an overhead view of the head mount 100 worn by a person having a relatively large head width.
Figure 5B:
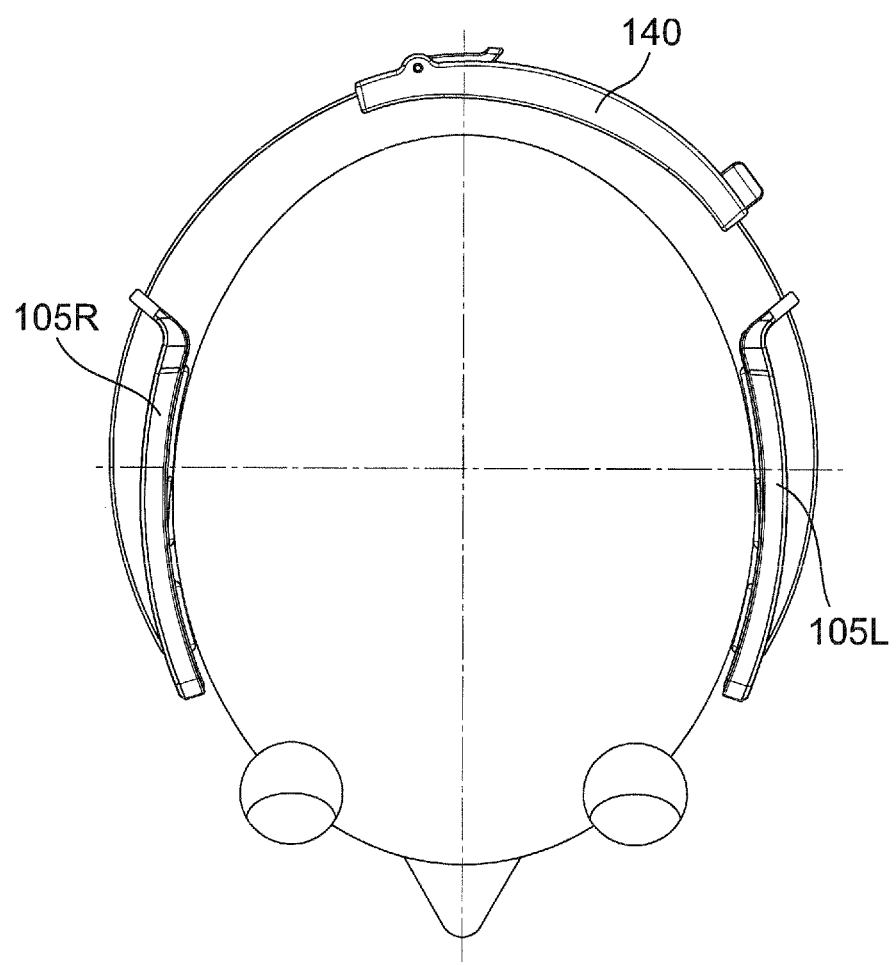
FIG. 5B is an overhead view of the head mount 100 worn by a person having a relatively small head width.
Figure 5C:
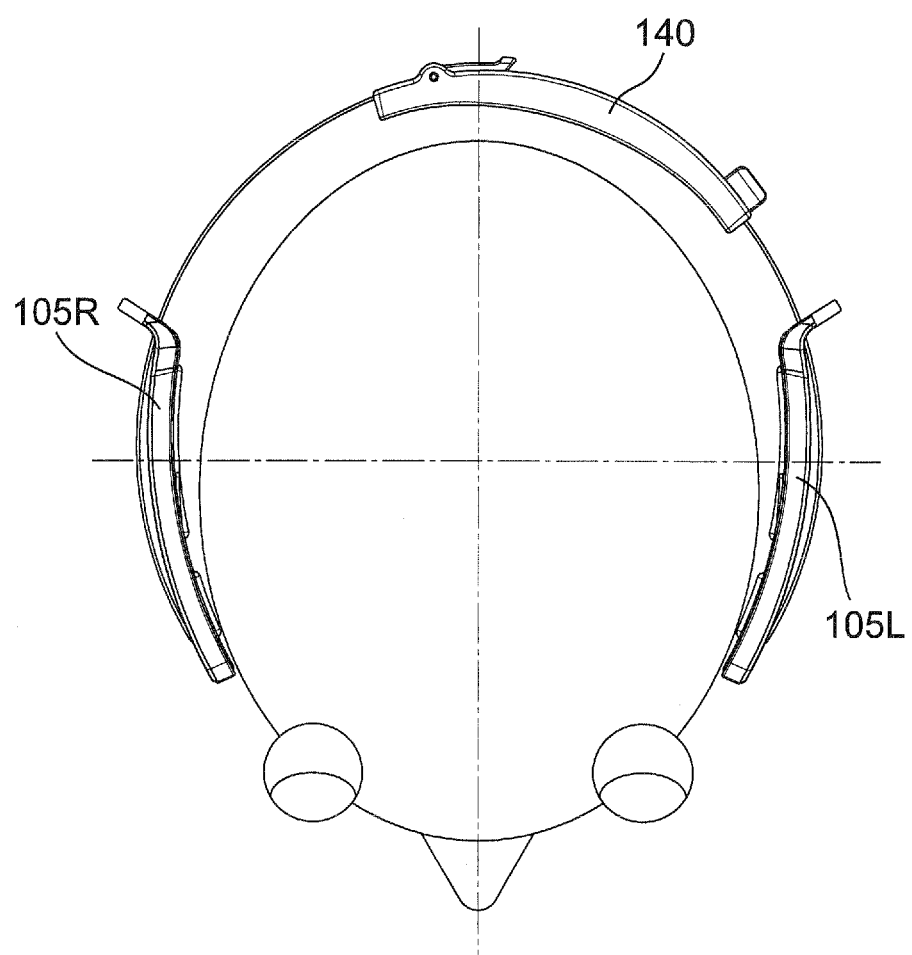
FIG. 5C is an overhead view of the worn head mount 100 when assuming that the pad units 105 include no pad springs 132.

Fitting improvement of the worn head mount 100 will be described next. FIGS. 5A to 5C are overhead views of the worn head mount 100.

FIG. 5A is an overhead view of the head mount 100 worn by a person having a relatively large head width. When the head mount 100 is worn by a wearer having a relatively large head width, the head springs 131 of the head arms 130 each curve into an expanded arc shape in accordance with the head size. The pad units 105 are brought into tight contact with lateral portions of the head of the wearer by the biasing force of restoring the pad springs 132 toward the head of the wearer. In this case, the pad units 105 come into tight contact with the head of the wearer at substantially entire areas of the inner portions. The pressing force thus disperses to reduce the load applied to the wearer.

FIG. 5B is an overhead view of the head mount 100 worn by a person having a relatively small head width. When the head mount 100 is worn by a wearer having a relatively small head width, the head springs 131 of the head arms 130 each curve into an expanded arc shape in accordance with the head width, by a smaller deformation amount than that of the case where the head mount 100 is worn by a wearer having a relatively large head width. In this case also, the pad units 105 are brought into tight contact with the lateral portions of the head of the wearer by the biasing force of restoring the pad springs 132 toward the head of the wearer. Again, the pad units 105 come into tight contact with the head of the wearer at the substantially entire areas of the inner portions. The pressing force thus disperses to reduce the load applied to the wearer.

FIG. 5C is an overhead view when assuming that the pad units 105 include no pad springs 132. There is applied no biasing force of restoring the pad springs 132 toward the head of the wearer in this case. The pad units 105 thus tighten the head of the wearer not at the substantially entire areas of the inner portions but only at substantial ends of the head springs 131. The pressing force concentrates at the single point of the head in contact with the end of each of the head springs 131 to generate a load applied to the wearer.

In this manner, the head mount 100 applies, to the head of the wearer, the lateral pressure from the head springs 131 as well as the lateral pressure from the pad springs 132. The lateral pressure from the head springs 131 is determined in accordance with the head of the wearer width (size). Meanwhile, the lateral pressure from the pad springs 132 is determined in accordance with the shape of the head of the wearer. The pad units 105 are thus configured to follow (the width and the shape of) the head of the wearer. Accordingly, the pad units 105 each apply the pressing force not to the single point but to the surface so as to reduce the load applied to the wearer. The head mount 100 further achieves tighter contact in correspondence with distribution of head widths of wearers.

The head arm unit 125 is divided into two parts of the head arm 130L and the head arm 130R in the above example, but can be configured differently. Specifically, the head arm unit 125 is not necessarily divided. Even in a case where the head arm unit 125 is not divided into two parts, the head mount 100 achieves similar fitting with the lateral pressure from the head springs 131 as well as the lateral pressure from the pad springs 132. However, the head mount 100 including the head arm unit 125 divided into the two parts is applicable to a larger number of wearers in more consideration of the distribution of human head widths.

4. Lock Mechanism of Head Arm 130

Figure 6:
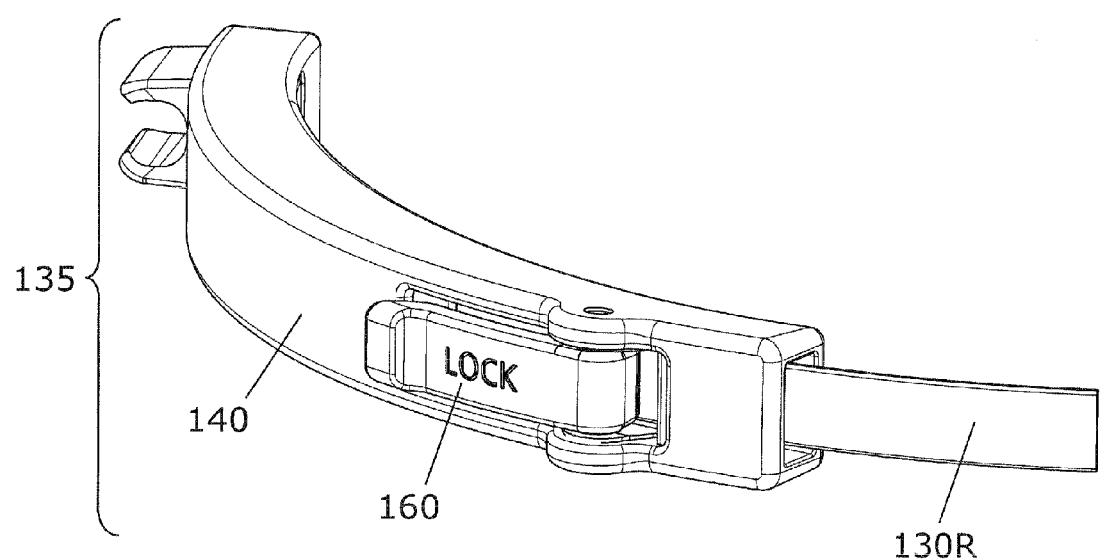
FIG. 6 is a perspective view of a locked adjusting unit 135.
Figure 7A:
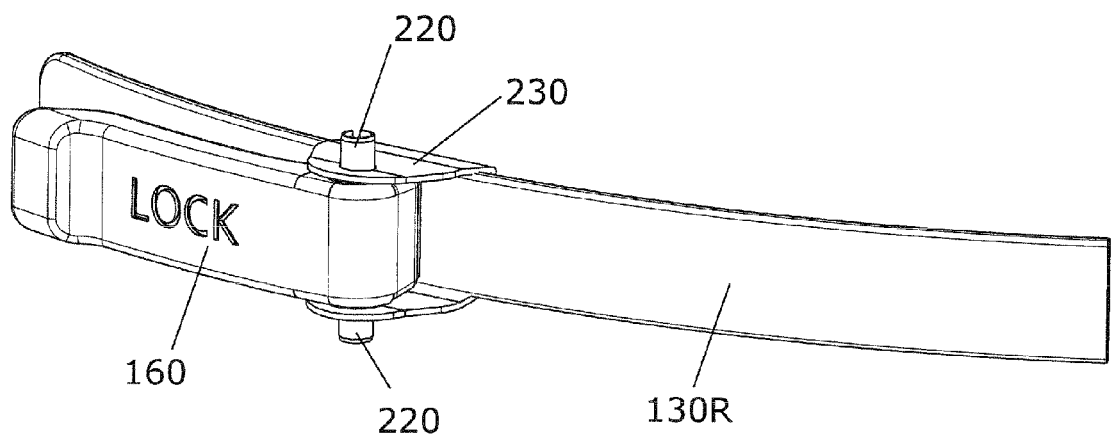
FIG. 7A is an explanatory perspective view of lock mechanism components.
Figure 7B:
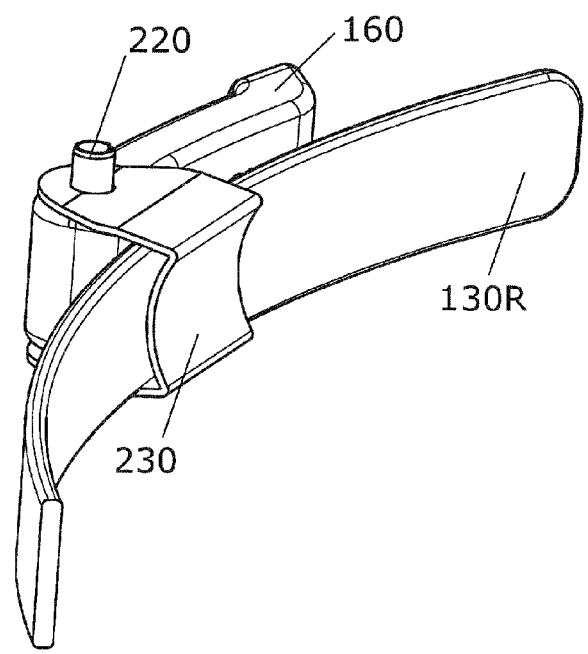
FIG. 7B is another explanatory perspective view of the lock mechanism components.

The lock mechanism of the head arm 130R will be described next. The lock mechanism provided at the adjusting unit 135 adjusts the length of the portion of the head arm 130R fitted into the adjusting unit 135 (the position of the fixed head arm 130R in the adjusting unit 135). FIG. 6 is a perspective view from behind a wearer, of the locked adjusting unit 135. FIGS. 7A and 7B are explanatory perspective views of lock mechanism components exposed in a case where the adjusting base 140 is removed from the adjusting unit 135. FIG. 7A is an explanatory perspective view from outside, of the lock mechanism components. FIG. 7B is an explanatory perspective view from inside, of the lock mechanism components.

As shown in FIGS. 6, 7A, and 7B, the adjusting unit 135 includes the adjusting lever 160, an adjusting spring 230, and an adjusting pin 220.

The adjusting lever 160 has a cam portion 221. The adjusting lever 160 is made of a resin material. The adjusting lever 160 is provided to be substantially adjacent to the cam portion 221, with a passing-through opening to allow the adjusting pin 220 to be inserted therethrough. The adjusting spring 230 has a U shape with a bottom curved inward into an arc shape. The adjusting spring 230 is made of a stainless steel material, in a manner similar to that of the head arms 130. The adjusting spring 230 is provided to be substantially adjacent to both ends of the U shape, with a pair of openings to allow the adjusting pin 220 to be inserted therethrough. The adjusting pin 220 is inserted to be passed through the opening of the adjusting lever 160 as well as the pair of openings of the adjusting spring 230. The adjusting lever 160 is thus configured to turn about the adjusting pin 220 relatively to the adjusting spring 230. The adjusting lever 160 turns to come into an uprising state from the head arm 130R (an unlocked state) and a lying state along the head arm 130R (a locked state).

Figure 8A:
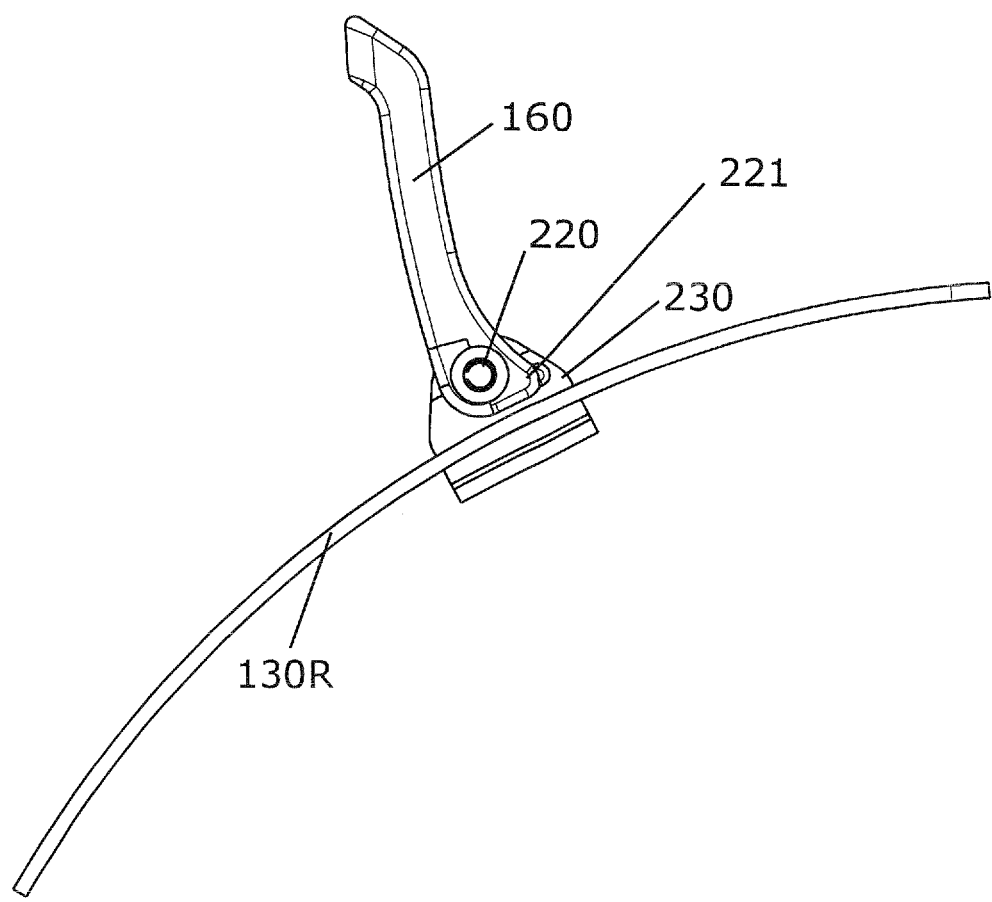
FIG. 8A is a state transition view of an unlocked adjusting lever 160.
Figure 8B:
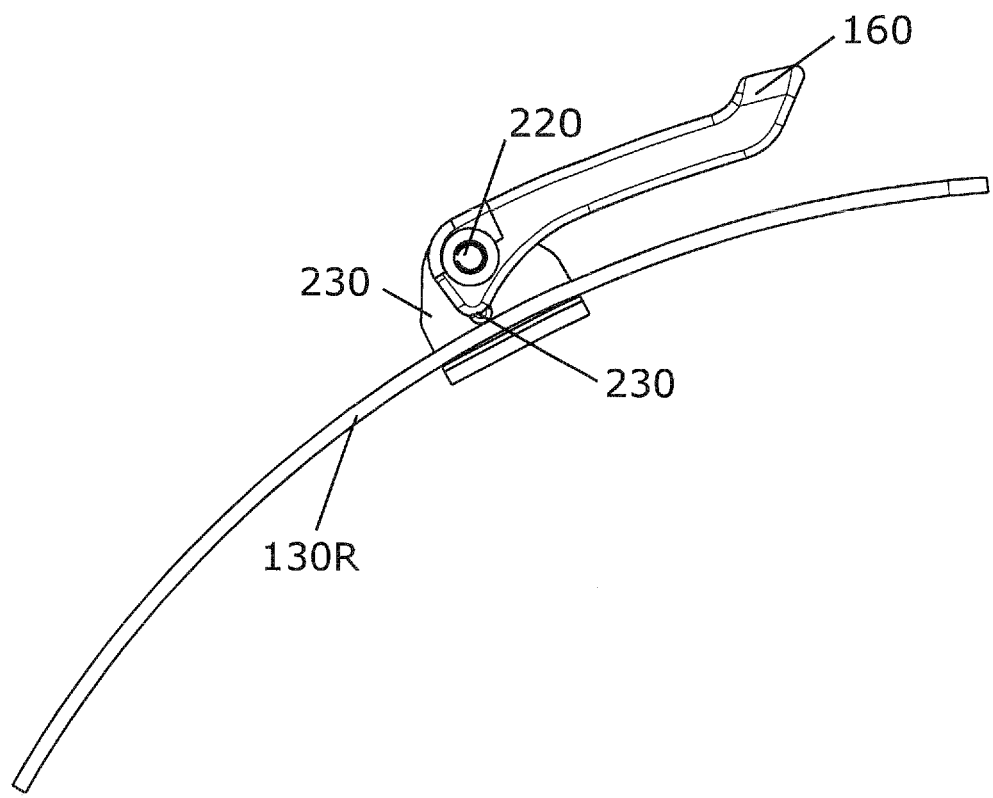
FIG. 8B is a state transition view of the locked adjusting lever 160.

FIGS. 8A and 8B are state transition views of the adjusting lever 160. FIG. 8A is a state transition view of the unlocked adjusting lever 160. FIG. 8B is a state transition view of the locked adjusting lever 160.

As shown in FIG. 8A, the unlocked adjusting lever 160 uprises from the head arm 130R. The cam portion 221 of the adjusting lever 160 is positioned not to be in contact with the head arm 130R. As the adjusting lever 160 is caused to be gradually inclined from the state shown in FIG. 8A, the cam portion 221 of the adjusting lever 160 comes into contact with the head arm 130R. As the adjusting lever 160 is caused to be further inclined, an action of leverage causes the cam portion 221 to press the head arm 130R toward the bottom of the adjusting spring 230 to reach the state shown in FIG. 8B.

On the other hand, as the adjusting lever 160 is gradually upraised from the state shown in FIG. 8B, the cam portion 221 applies, to the head arm 130R, less pressing force toward the bottom of the adjusting spring 230, and finally comes into no contact with the head arm 130R. The further raised adjusting lever 160 comes into the state shown in FIG. 8A.

The lock mechanism of the adjusting unit 135 presses the head arm 130R toward the bottom of the adjusting spring 230, and causes the adjusting spring 230 having the U shape to firmly pinch the pair of opposing plate-end surfaces of the head arm 130R.

Figure 9A:
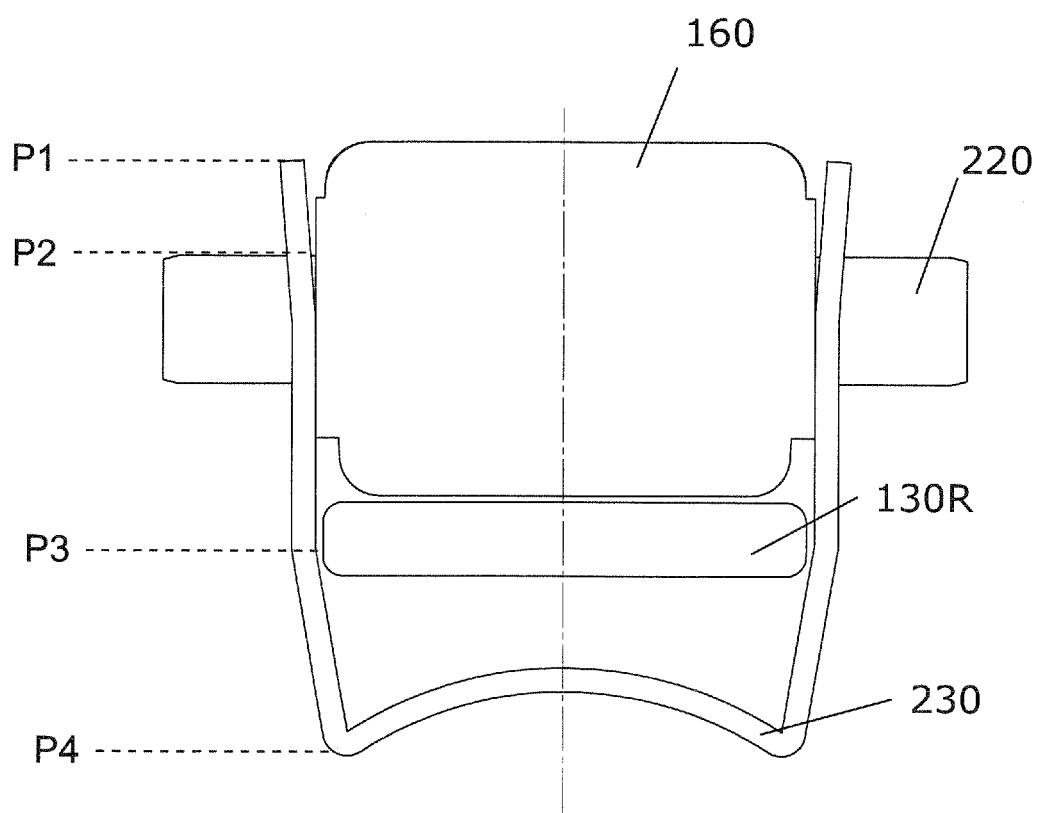
FIG. 9A is a state transition view of an unlocked adjusting spring 230.
Figure 9B:
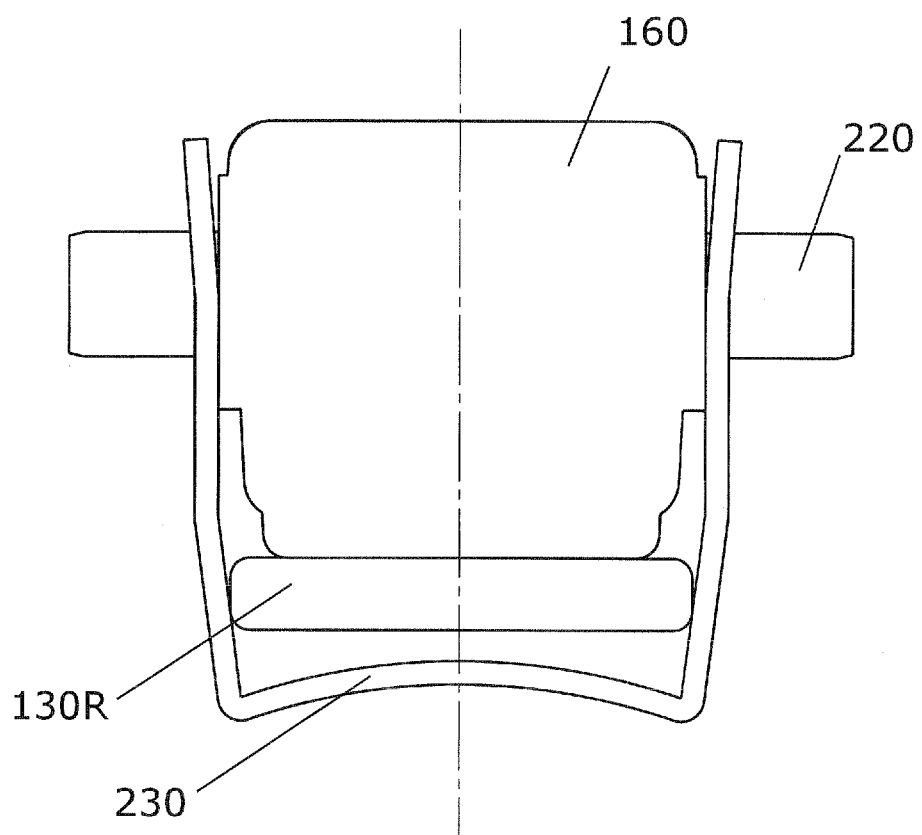
FIG. 9B is a state transition view of the locked adjusting spring 230.

FIGS. 9A and 9B are state transition views of the adjusting spring 230 in a state where the head arm 130R is pressed toward the bottom of the adjusting spring 230. FIG. 9A is a state transition view of the unlocked adjusting spring 230. In contrast, FIG. 9B is a state transition view of the locked adjusting spring 230. FIGS. 9A and 9B each show a vertical section of the adjusting spring 230.

As shown in FIGS. 9A and 9B, the adjusting spring 230 has the bottom curved inward into the arc shape, and sides continuously provided to the bottom. The sides of the adjusting spring 230 each have (1) a portion from points P1 to P2, (2) a portion from points P2 to P3, and (3) a portion from points P3 to P4, where the shapes of these portions are different from one another. The portions from the points P1 to P2 of the sides of the adjusting spring 230 form a tapered shape with an increasing width toward the open end of the U shape. These portions are not required to have this shape, which facilitates attachment of the adjusting lever 160 to the adjusting spring 230 in the production process of the head mount 100. The subsequent portions from the points P2 to P3 of the sides of the adjusting spring 230 each have a vertically linear shape. This shape facilitates attachment of the adjusting pin 220 to the adjusting spring 230. The portion from the points P2 to P3 of the adjusting spring 230 has a width slightly larger than the width of the head arm 130R. The head arm 130R positioned between the points P2 and P3 is thus movable freely inside the adjusting spring 230. The subsequent portions from the points P3 to P4 of the sides of the adjusting spring 230 form a tapered shape with a decreasing width toward the bottom of the adjusting spring 230. The portion from the points P3 to P4 of the adjusting spring 230 has a decreasing width toward the bottom so as to be smaller than the width of the head arm 130R. The entire sides of the adjusting spring 230 are alternatively tapered to have a decreasing width toward the bottom, but are desired to be vertical to the axis of the adjusting pin 220 for facilitated attachment of the adjusting pin 220 in the production process of the head mount 100.

The transition between the unlocked state and the locked state will be described next. As shown in FIG. 9A, the unlocked head arm 130R is not pressed toward the bottom of the adjusting spring 230 by the adjusting lever 160, and is thus positioned at a location corresponding to a location between the points P2 and P3 of the adjusting spring 230. The width of the head arm 130R is slightly larger than the width of the adjusting spring 230 in this state. A wearer can thus adjust the length of the portion of the head arm 130R fitted into the adjusting spring 230 (the position of the fixed head arm 130R in the adjusting spring 230).

On the other hand, the locked head arm 130R is pressed downward in the adjusting spring 230 by the adjusting lever 160 as shown in FIG. 9B. The plate-end surfaces of the head arm 130R are in contact with the tapered portions of the sides of the adjusting spring 230 in this state. Because the head arm 130R is pressed downward in the adjusting spring 230, the curved bottom of the adjusting spring 230 generates an elastic force. The elastic force enlarges the width of the tapered portions from the points P3 to P4 of the sides of the adjusting spring 230. Gradual increase in width of the tapered shape increases the biasing force applied from the sides of the adjusting spring 230 toward the plate-end surfaces of the head arm 130R. This biasing force generates the force of pressing upward the head arm 130R. However, the adjusting lever 160 is fixed immediately above the head arm 130R to prevent upward movement of the head arm 130R, and fix the plate-end surfaces of the head arm 130R.

When the adjusting lever 160 is unlocked again, the space having been occupied by the adjusting lever 160 is emptied to release the force of pressing upward the head arm 130R. The head arm 130R becomes thus movable upward in the adjusting spring 230 to cancel fixation of the plate-end surfaces of the head arm 130R.

The head arm 130R has a pair of opposing plate surfaces of relatively large areas, and a pair of opposing plate-end surfaces of relatively small areas. Upon application of an equal biasing load, the pressure applied to the plate-end surfaces of the relatively small areas is larger than the pressure applied to the plate surfaces of the relatively large areas in this case. Fixing the plate-end surfaces of the head arm 130R thus achieves firmer fixation of the head arm 130R even with a smaller biasing load.

As described above, the head mount 100 according to the first embodiment is configured to improve fit into the head of the wearer as well as reduce the load applied to the head. Further, this head mount 100, which is light in weight and configured simply, enables continuous fit into the head. The head mount 100 thus achieves a mounting performance higher than that of prior art.

5. Other Non-Limiting and Exemplary Embodiments

The first embodiment has been described above to exemplify the technique disclosed in the present application. However, the technique described in the present disclosure is not limited to the first embodiment, and is also applicable to any embodiments obtained by appropriate modification, replacement, addition, removal, or the like.

Figure 10:
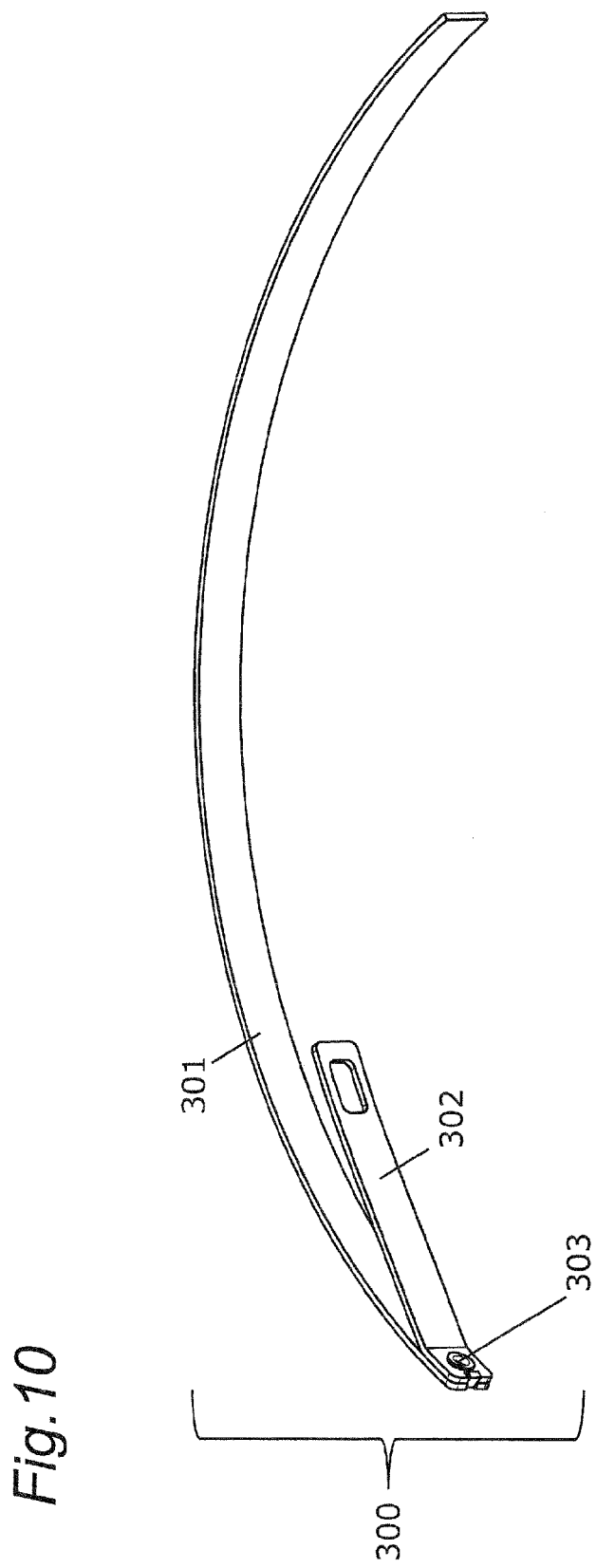
FIG. 10 is a perspective view of a head arm 300 according to another embodiment.

For example, the head spring 131R and the pad spring 132R are provided integrally with each other in the head arm 130R according to the first embodiment as shown in FIG. 3, but can be configured to be different from that. Specifically, the head spring 131R and the pad spring 132R are alternatively provided separately from each other. This also applies to the head arm 130L. FIG. 10 is a perspective view of a head arm 300 according to another embodiment. FIG. 10 exemplifies a configuration in which an end of a head spring 301 according to the other embodiment and an end of a pad spring 302 according to the other embodiment are integrated by a crimping component 303 according to the other embodiment. The end of the head spring 301 according to the other embodiment and the end of the pad spring 302 according to the other embodiment can be coupled to each other not by crimping but by engagement between engaging shapes.

The head arms 130 according to the first embodiment each have the arc shape, but can be shaped to be different from that. At least the portions of the head arms 130 accommodated in the adjusting unit 135 may not have the arc shape but may have a linear shape. The linear shape will achieve free adjustment of the lateral pressure as desired by a wearer regardless of the head of the wearer width (size) upon adjustment in length of the head arms 130.

Although the first embodiment recites the head mount configured to have a camera body, the first embodiment can be applied to a headset. In the case where the first embodiment is applied to an exemplary headset, the pad unit 105L partially extends downward, and has a distal end provided with a housing to cover a left ear, while the pad unit 105R partially extends downward and has a distal end provided with a housing to cover a right ear. The housings each accommodate a speaker configured to deliver sound to the corresponding ear.

The constituent components shown in the accompanying drawings and mentioned in the detailed description may include those essential for achievement of the object of the present disclosure as well as those unessential for the achievement. Inclusion of such unessential constituent components in the accompanying drawings or the detailed description should not directly indicate that such unessential constituent components be regarded as being essential.

The above-mentioned embodiments merely exemplifies the technique described in the present disclosure, and can thus have modification, replacement, addition, removal, or the like in various manners within the scope of the claims and an equivalent scope.

6. Summary of Non-Limiting and Exemplary Embodiments and the Like

The embodiments and the like configured as described above have the following subject matters of the present disclosure. Brackets contain reference signs of corresponding members or components.

According to the first aspect of the present disclosure, there is provided a mounting apparatus including a first spring member (131R, 131L, 301), a second spring member (132R, 132L, 302), and a holding member (105R, 105L). The first spring member (131R, 131L, 301) has an arc shape. The second spring member (132R, 132L, 302) is provided integrally with the first spring member (131R, 131L, 301) or provided separately from the first spring member (131R, 131L, 301) to be coupled to the second spring member (132R, 132L, 302), and the second spring member (132R, 132L, 302) is disposed inside the first spring member (131R, 131L, 301) at a predetermined angle from the first spring member (131R, 131L, 301). The holding member (105R, 105L) holds the second spring member (132R, 132L, 302) to be fitted into the holding member (105R, 105L) such that the holding member (105R, 105L) is in contact with a wearer.

According to the second aspect of the present disclosure, in the first aspect of the present disclosure, the holding member (105R, 105L) has an opening (200L) into which the second spring member (132R, 132L, 302) is fitted substantially at a first end of the holding member (105R, 105L), and another opening (210L) through which the first spring member (131R, 131L, 301) is passed through substantially at a second end of the holding member (105R, 105L).

According to the third aspect of the present disclosure, in the first or second aspect of the present disclosure, the second spring member (132R, 132L, 302) and the holding member (105R, 105L) are provided as a pair of left and right members for the wearer, respectively.

According to the fourth aspect of the present disclosure, in the third aspect of the present disclosure, the holding member (105R, 105L) that is one of the pair of left and right members has an attachment portion (180) for electronic equipment.

According to the fifth aspect of the present disclosure, in any one of the first to fourth aspects of the present disclosure, the first spring member (131R, 131L, 301) at least includes a first component (131R) and a second component (131L). The mounting apparatus further includes an adjustment mechanism (135) that adjusts a length of a portion of at least one of the first component (131R) and the second component (131L), where the portion thereof is fitted into the adjustment mechanism (135).

According to the sixth aspect of the present disclosure, in the fifth aspect of the present disclosure, the adjustment mechanism (135) includes a pressing member (160), and a third spring member (230), and the third spring member (230) has a width gradually decreasing toward a bottom of the third spring member (230). The pressing member (160) presses at least one of the first component (131R) and the second component (131L) toward the bottom of the third spring member (230), and the third spring member (230) pinches a pair of opposing plate-end surfaces of at least one of the pressed first and second components (131L, 131R) in accordance with the pressing.

According to the seventh aspect of the present disclosure, there is provided a mounting apparatus including a first spring member (130R), and an adjusting mechanism (135). The adjustment mechanism (135) adjusts a length of a portion of the first spring member (130R), where the portion of the first spring member (130R) is fitted into the adjustment mechanism (135). The adjustment mechanism (135) includes a pressing member (160), second spring member (230) having a width gradually decreasing toward a bottom of the second spring member (230). The pressing member (160) presses the first spring member (130R) toward the bottom of the second spring member (230), and the second spring member (230) pinches a pair of opposing plate-end surfaces of the first spring member (130R) in accordance with the pressing.

The present disclosure is not limited to application to the head mount 100 for mounting a head. However, the present disclosure can be applied to the other head mounting apparatus such as a headphone etc., and a mounting apparatus for mounting to the regions of the body other than the head of the body, such as a human arm, a human wrist etc.

What is claimed is:

1. A head mounting apparatus comprising:
   a first spring member having an arc shape;
   a second spring member provided integrally with the first spring member to be coupled to the second spring member, the second spring member being disposed inside the first spring member and extending at a predetermined angle from the first spring member; and
   a holding member that holds the second spring member so as to be fitted into the holding member such that the holding member is in contact with a wearer,
   wherein the holding member has a first opening substantially at a first end thereof, and the second spring member is inserted in the first opening to be fitted substantially at the first end of the holding member to generate a lateral pressure.

2. The mounting apparatus as claimed in claim 1,
   wherein the holding member has a second opening through which the first spring member is passed through substantially at a second end of the holding member.

3. The mounting apparatus as claimed in claim 2,
wherein the first spring member at least includes a first component and a second component, and
wherein the mounting apparatus further comprises an adjustment mechanism that adjusts a length of a portion of at least one of the first and second components, the portion thereof being fitted into the adjustment mechanism.

4. The mounting apparatus as claimed in claim 2, wherein the holding member comprises a base member and a cover member, and the second spring acts on the cover member to bias the holding member toward the head of a wearer, and
wherein the first and second openings are formed in the base member.

5. The mounting apparatus as claimed in claim 1, wherein the second spring member and the holding member are provided as a pair of left and right members for the wearer, respectively.

6. The mounting apparatus as claimed in claim 5, wherein the holding member that is one of the pair of left and right members has an attachment portion for electronic equipment.

7. The mounting apparatus as claimed in claim 6,
wherein the first spring member at least includes a first component and a second component, and
wherein the mounting apparatus further comprises an adjustment mechanism that adjusts a length of a portion of at least one of the first and second components, the portion thereof being fitted into the adjustment mechanism.

8. The mounting apparatus as claimed in claim 5,
wherein the first spring member at least includes a first component and a second component, and
wherein the mounting apparatus further comprises an adjustment mechanism that adjusts a length of a portion of at least one of the first and second components, the portion thereof being fitted into the adjustment mechanism.

9. The mounting apparatus as claimed in claim 1,
wherein the first spring member at least includes a first component and a second component, and
wherein the mounting apparatus further comprises an adjustment mechanism that adjusts a length of a portion of at least one of the first and second components, the portion thereof being fitted into the adjustment mechanism.

10. The mounting apparatus as claimed in claim 9,
wherein the adjustment mechanism includes a pressing member, and a third spring member, the third spring member having a width gradually decreasing toward a bottom of the third spring member, and
wherein the pressing member presses at least one of the first and second components toward the bottom of the third spring member, and the third spring member pinches a pair of opposing plate-end surfaces of at least one of the pressed first and second components in accordance with the pressing.

11. The mounting apparatus as claimed in claim 1, wherein the holding member comprises a base member and a cover member, wherein the second spring acts on the cover member to bias the holding member toward the head of a wearer.

12. The mounting apparatus as claimed in claim 11, wherein first opening is formed in the base member.

13. A mounting apparatus comprising:
a first spring member;
a second spring member integrally connected to the first spring member;
a holding member that holds the second spring member so as to be fitted therein,
wherein the holding member has a first opening substantially at a first end thereof, and the second spring member is inserted in the first opening to be fitted substantially at the first end of the holding member to generate a lateral pressure to the head of a wearer; and
an adjustment mechanism that adjusts a length of a portion of the first spring member, the portion of the first spring member being fitted into the adjustment mechanism,
wherein the adjustment mechanism includes a pressing member, second spring member having a width gradually decreasing toward a bottom of the second spring member, and
wherein the pressing member presses the first spring member toward the bottom of the second spring member, and the second spring member pinches a pair of opposing plate-end surfaces of the first spring member in accordance with the pressing.

14. The mounting apparatus as claimed in claim 13, wherein the holding member comprises a base member and a cover member, and the second spring acts on the cover member to bias the holding member toward the head of a wearer.

* * * * *